US010823395B1

(12) United States Patent
Hsu

(10) Patent No.: US 10,823,395 B1
(45) Date of Patent: Nov. 3, 2020

(54) MULTIFUNCTIONAL WALL LAMP WITH ACOUSTICS DEVICE

(71) Applicant: Dong Guan Bright Yinhuey Lighting Co., Ltd. China, Guang Dong (CN)

(72) Inventor: Kevin Hsu, Taichung (TW)

(73) Assignee: Dong Guan Bright Yinhuey Lighting Co., Ltd. China, Guang Dong (CN)

( * ) Notice: Subject to any disclaimer, the term of this patent is extended or adjusted under 35 U.S.C. 154(b) by 0 days.

(21) Appl. No.: 16/792,982

(22) Filed: Feb. 18, 2020

(51) Int. Cl.
| F21L 19/00 | (2006.01) |
| F21V 33/00 | (2006.01) |
| H05B 47/11 | (2020.01) |
| H05B 46/00 | (2020.01) |
| F21S 13/02 | (2006.01) |

(52) U.S. Cl.
CPC .......... *F21V 33/0056* (2013.01); *F21L 19/00* (2013.01); *F21S 13/02* (2013.01); *H05B 46/00* (2020.01); *H05B 47/11* (2020.01)

(58) Field of Classification Search
CPC ....... F21V 33/0056; F21L 19/00; F21S 13/02; H05B 46/00; H05B 47/11
See application file for complete search history.

(56) References Cited

U.S. PATENT DOCUMENTS

| 6,280,053 B1* | 8/2001 | Chien | A43B 5/16 |
| | | | 362/157 |
| 2001/0033481 A1* | 10/2001 | Chien | F21S 19/00 |
| | | | 362/34 |
| 2004/0239243 A1* | 12/2004 | Roberts | F21S 43/14 |
| | | | 313/512 |
| 2012/0012574 A1* | 1/2012 | Vandrak | F21L 14/04 |
| | | | 219/220 |

OTHER PUBLICATIONS

InnovationQPlus Discover search results for claim 1 of U.S. Appl. No. 16/792,982 Aug. 10, 2020 (Year: 2020).*

* cited by examiner

*Primary Examiner* — Isiaka O Akanbi
*Assistant Examiner* — Glenn D Zimmerman
(74) *Attorney, Agent, or Firm* — Karin L. Williams; Mayer & Williams PC

(57) ABSTRACT

A wall lamp includes a lamp body, a mounting unit mounted on the lamp body, and a kerosene lighting mounted in the lamp body. The lamp body includes a housing, a door, a charging seat, a light source, and a light sensitive device. A Bluetooth receiver is mounted on the acoustics device. The kerosene lighting is removed from the housing and is operated individually when the door is pivoted outward from the housing. The light sensitive device detects a strength of a light after the kerosene lighting is removed from the housing, and turns on/off the light source module after the kerosene lighting is removed from the housing.

7 Claims, 5 Drawing Sheets

MULTIFUNCTIONAL WALL LAMP WITH ACOUSTICS DEVICE

BACKGROUND OF THE INVENTION

1. Field of the Invention

The present invention relates to an illuminating apparatus and, more particularly, to a kerosene wall lamp.

2. Description of the Related Art

A conventional wall lamp is attached to the wall in a house to provide an auxiliary illuminating function. However, the conventional wall lamp only has a single function. In addition, the conventional wall lamp is affixed to the wall and does not have a mobile function, such that the user cannot carry the wall lamp when necessary, thereby limiting the versatility of the conventional wall lamp.

BRIEF SUMMARY OF THE INVENTION

The primary objective of the present invention is to provide a multifunctional wall lamp with an acoustics device.

In accordance with the present invention, there is provided a wall lamp comprising a lamp body, a mounting unit mounted on the lamp body, and a kerosene lighting mounted in the lamp body. The lamp body is attached to a wall or a bearing article by the mounting unit. The lamp body includes a housing, a door pivotally connected with the housing, a charging seat mounted in the housing, a light source module mounted in the housing, and a light sensitive device electrically connected with the light source module. The kerosene lighting is received in the housing and is mounted on the charging seat. The kerosene lighting includes a pedestal, a lighting device, an acoustics device, a lamp holder, a lampshade, and a dimmer. The pedestal is placed on the charging seat. The acoustics device is mounted in the pedestal. The lamp holder is mounted on the pedestal and located above the acoustics device. The lighting device is mounted on the lamp holder. The lampshade is mounted on the lamp holder and located outside of the lighting device. The dimmer is mounted on the lamp holder and connected with the lighting device, to turn on/off the lighting device, and to regulate a brightness of the lighting device. A Bluetooth receiver is mounted on the acoustics device. A control panel is mounted on an outer face of the pedestal, to turn on/off the acoustics device, and to regulate a volume of the acoustics device. The kerosene lighting is removed from the housing and is operated individually when the door is pivoted outward from the housing. The light sensitive device detects a strength of a light after the kerosene lighting is removed from the housing, and turns on/off the light source module.

According to the primary advantage of the present invention, each of the lamp body and the kerosene lighting functions as a mobile lamp and is operated individually, such that the wall lamp is available for various situations and places, thereby enhancing the diversity of the wall lamp.

According to another advantage of the present invention, the wall lamp is used indoors and outdoors.

According to a further advantage of the present invention, the wall lamp has a Bluetooth speaker function, thereby enhancing the versatility of the wall lamp.

Further benefits and advantages of the present invention will become apparent after a careful reading of the detailed description with appropriate reference to the accompanying drawings.

BRIEF DESCRIPTION OF THE SEVERAL VIEWS OF THE DRAWING(S)

DETAILED DESCRIPTION OF THE INVENTION

Figure 1:
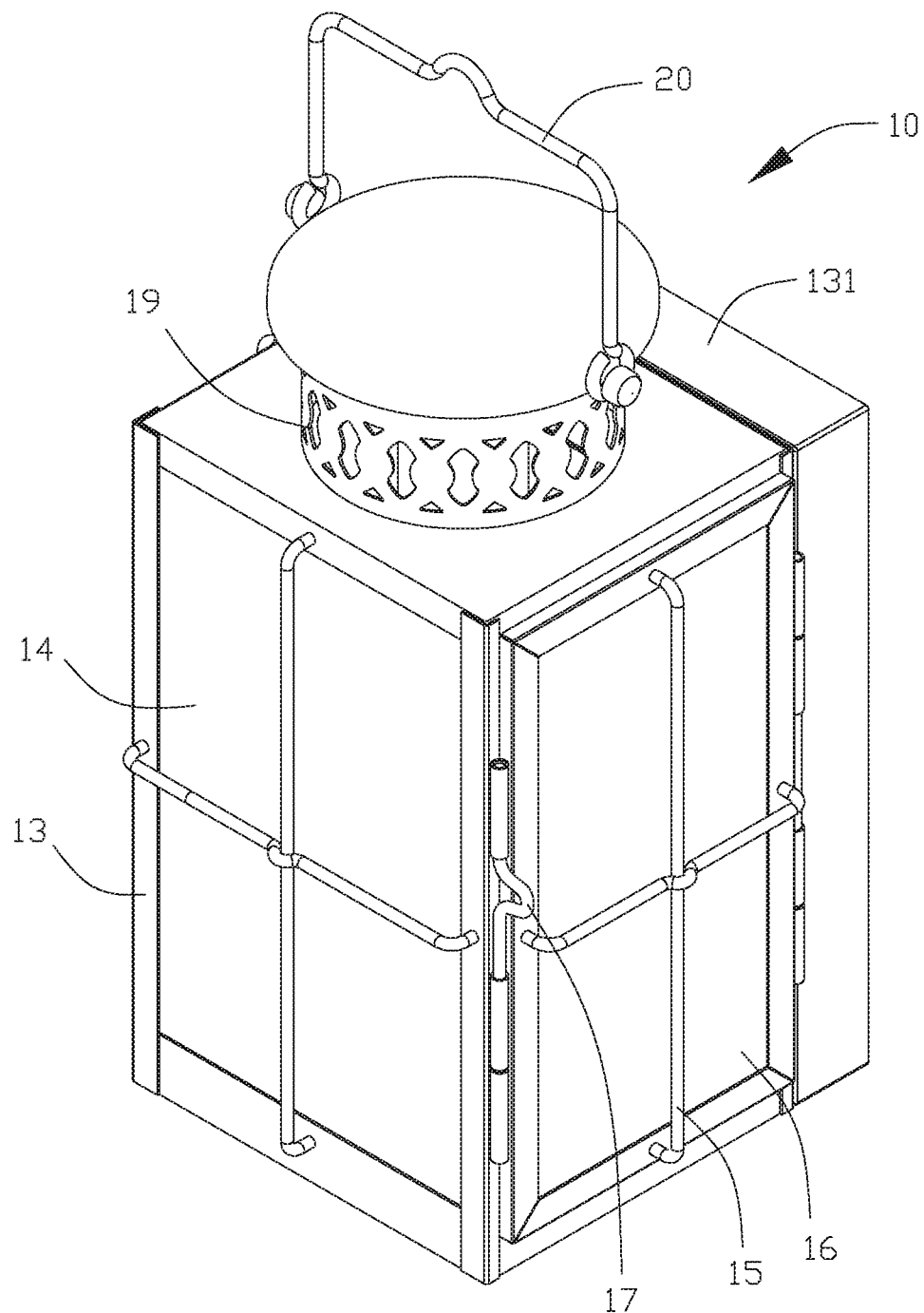
FIG. 1 is a perspective view of a wall lamp in accordance with the preferred embodiment of the present invention.
Figure 2:
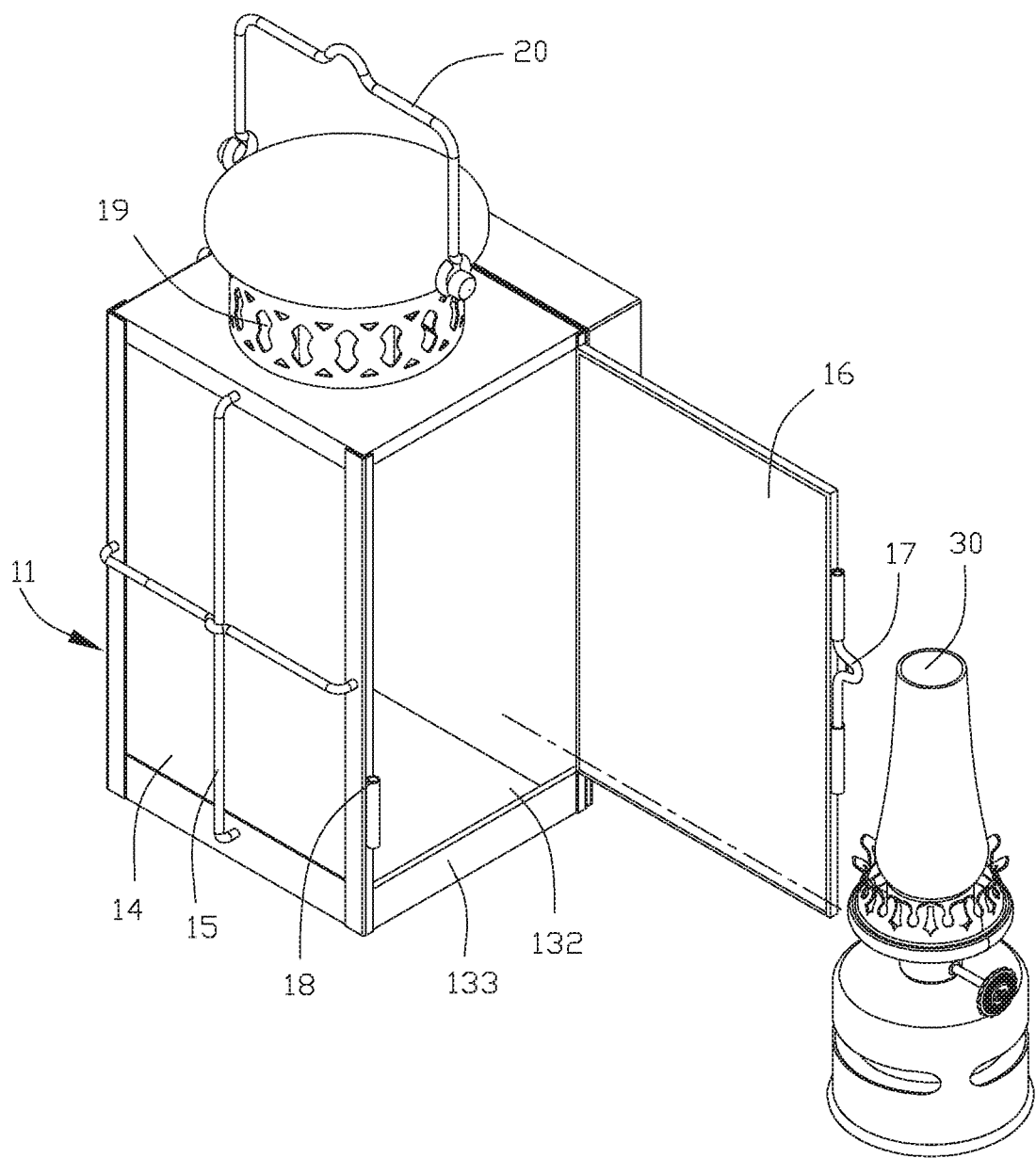
FIG. 2 is a perspective operational view showing the kerosene lighting is removed from the lamp body.
Figure 3:
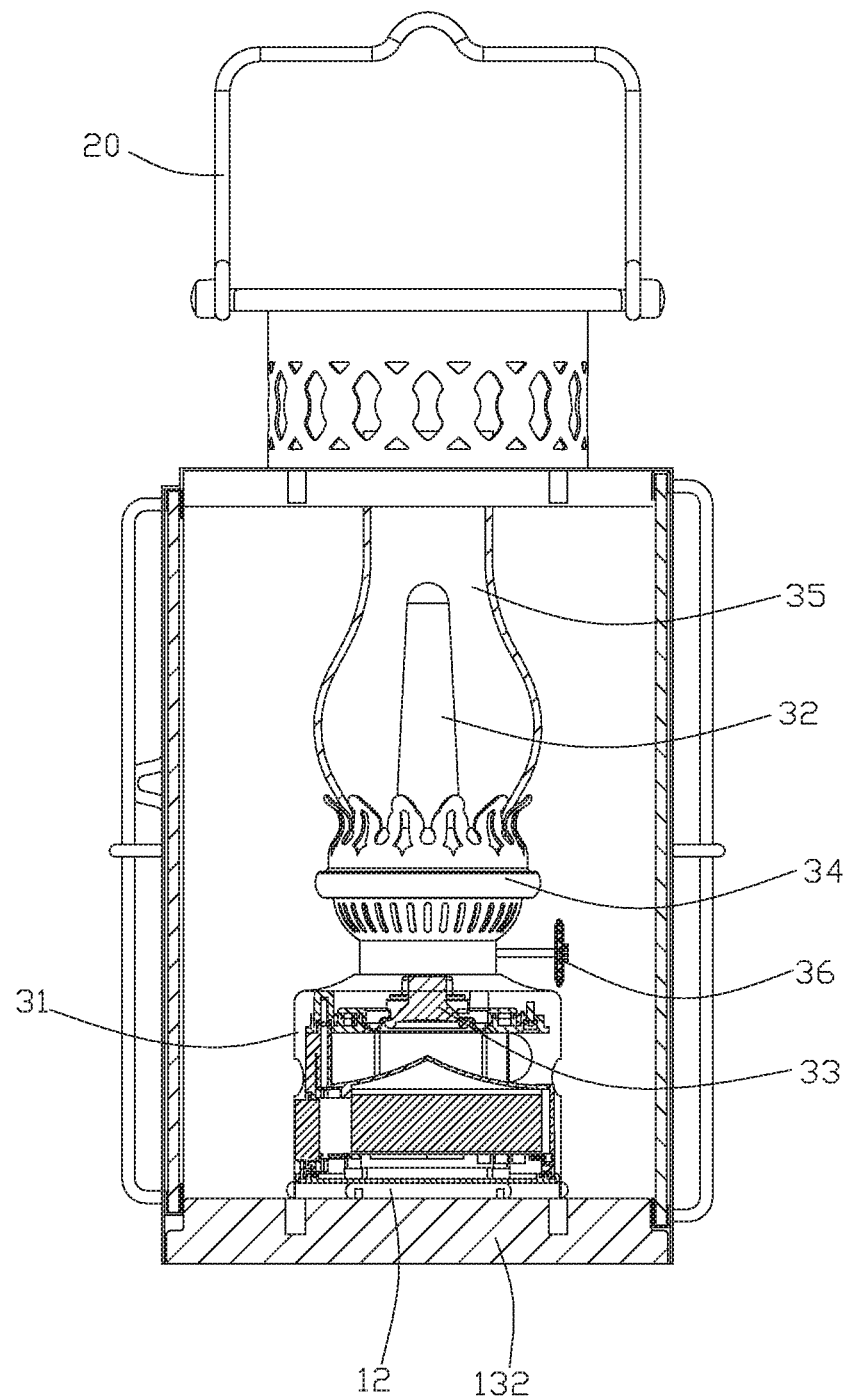
FIG. 3 is a front cross-sectional view of the wall lamp taken as shown in FIG. 1.
Figure 4:
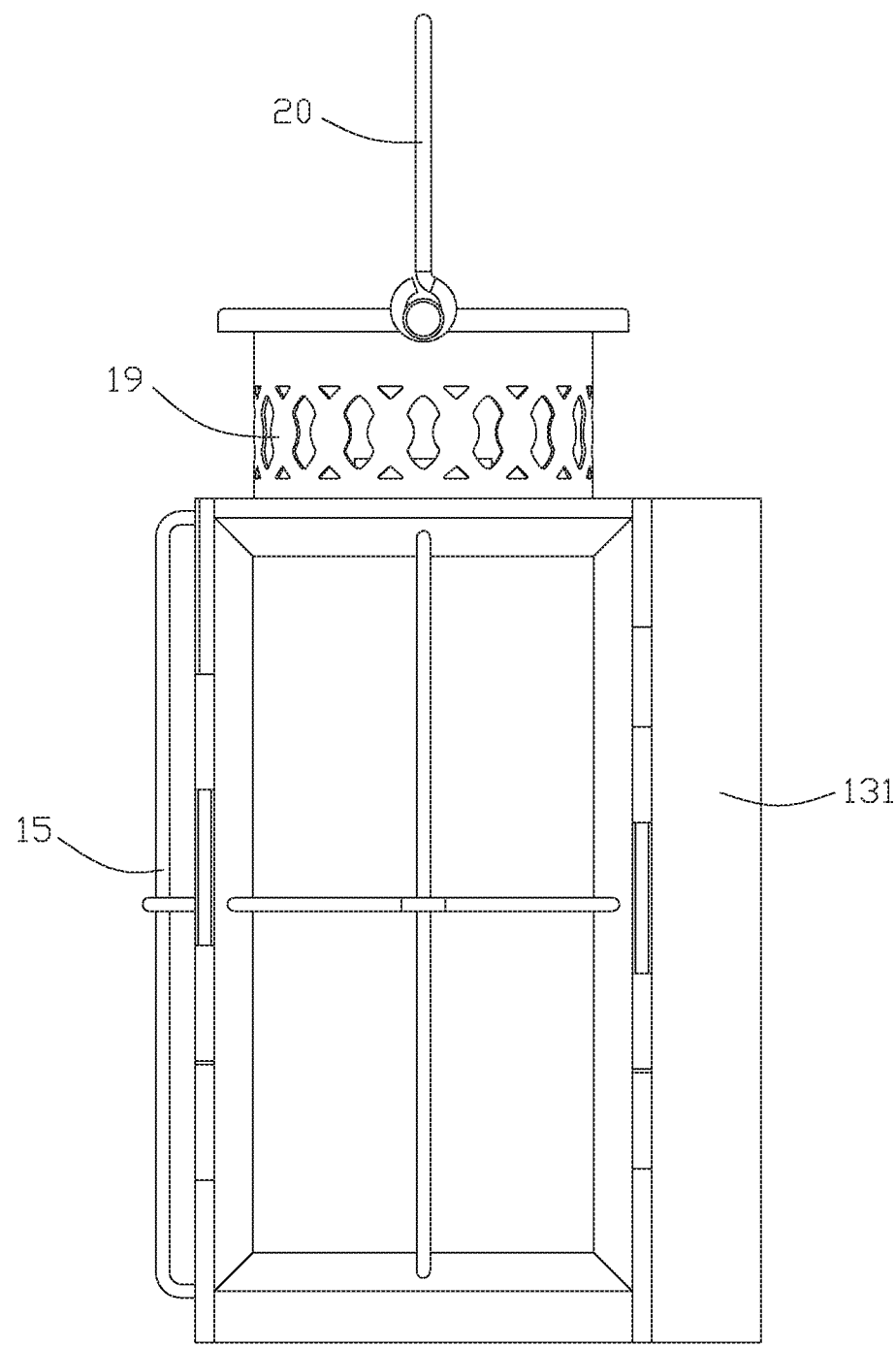
FIG. 4 is a side view of the wall lamp taken as shown in FIG. 1.
Figure 5:
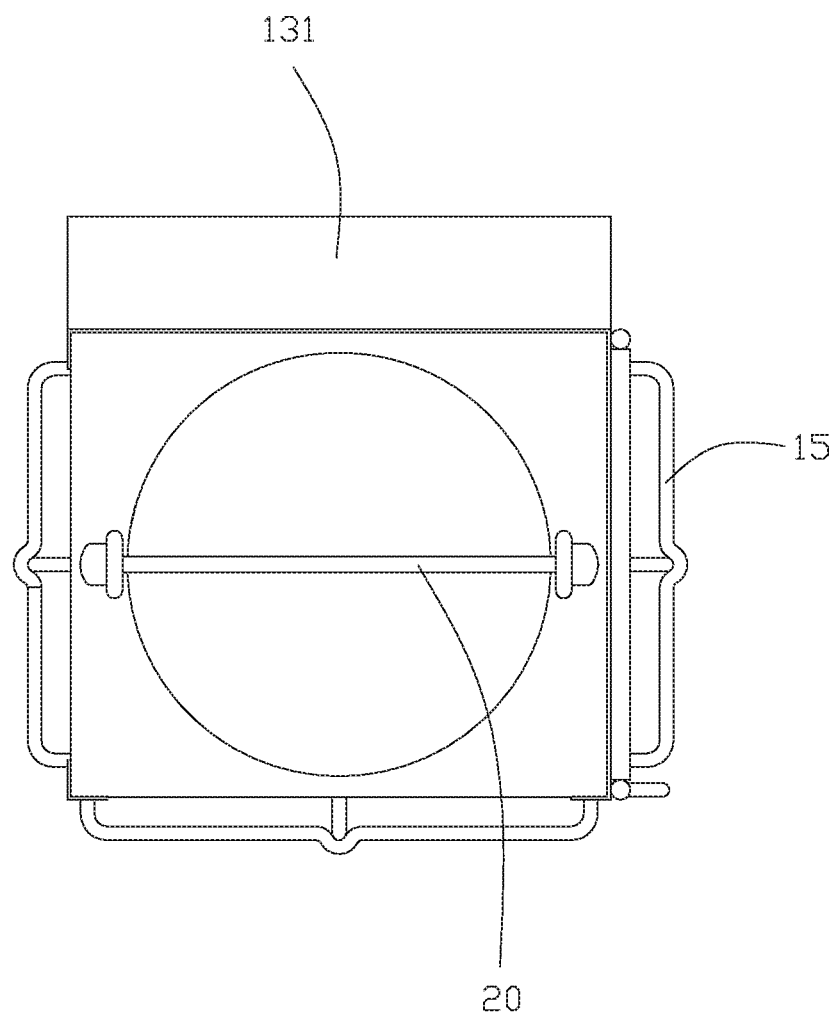
FIG. 5 is a top view of the wall lamp taken as shown in FIG. 1.

Referring to FIGS. 1-5, a wall lamp in accordance with the preferred embodiment of the present invention comprises a lamp body 10, a mounting unit mounted on the lamp body 10, and a kerosene lighting 30 mounted in the lamp body 10.

The lamp body 10 is attached to a wall or a bearing article by the mounting unit. The lamp body 10 includes a housing 11, a door 16 pivotally connected with a side of the housing 11 to open or close the housing 11, a charging seat 12 mounted in the housing 11, a light source module mounted in the housing 11, and a light sensitive (or photosensitive) device electrically connected with the light source module.

The kerosene lighting 30 is received in the housing 11 and is mounted on the charging seat 12. Thus, the charging seat 12 positions and charges the kerosene lighting 30. The kerosene lighting 30 includes a pedestal 31, a lighting device 32, an acoustics device 33, a lamp holder 34, a lampshade 35, and a dimmer (or light regulating device) 36.

The pedestal 31 is placed on the charging seat 12. The acoustics device 33 is mounted in the pedestal 31. The lamp holder 34 is mounted on the pedestal 31 and located above the acoustics device 33. The lighting device 32 is mounted on the lamp holder 34. The lampshade 35 is mounted on the lamp holder 34 and located outside of the lighting device 32. The dimmer 36 is mounted on the lamp holder 34 and connected with the lighting device 32, to turn on/off the lighting device 32, and to regulate a brightness of the lighting device 32. A Bluetooth receiver is mounted on the acoustics device 33. The Bluetooth receiver is connected with an external terminal, such as a smart phone, to switch and play audio signals. A control panel is mounted on an outer face of the pedestal 31, to turn on/off the acoustics device 33, and to regulate a volume of the acoustics device 33.

The kerosene lighting 30 is removed from the housing 11 and is operated individually when the door 16 is pivoted outward from and opens the housing 11. The light sensitive device detects a strength of a light after the kerosene lighting 30 is removed from the housing 11, and turns on/off the light source module.

In the preferred embodiment of the present invention, the housing 11 includes a lamp frame 13, and a plurality of transparent boards 14 mounted on the lamp frame 13. The lamp frame 13 is sealed by the transparent boards 14 which prevent foreign substances, such as insects, dirt or dust from entering the housing 11.

In the preferred embodiment of the present invention, the mounting unit has an L-shaped arrangement. The mounting unit includes a side board 131, and a bottom board 132 connected with the side board 131. The side board 131 is mounted on a side of the lamp frame 13. The bottom board 132 extends to a bottom of the lamp frame 13. The side board 131 is secured to a wall or a mounting place. The bottom board 132 is used to support the wall lamp.

In the preferred embodiment of the present invention, the wall lamp further comprises a hanging member 20 mounted on a top or a side of the housing 11 of the lamp body 10. Thus, the hanging member 20 facilitates the user hanging and carrying the wall lamp.

In the preferred embodiment of the present invention, the lamp body 10 further includes a head 19 mounted on a top of the housing 11. The head 19 is hollow and connected to the housing 11. The head 19 has a peripheral wall provided with a plurality of ornamental holes such that the light from the kerosene lighting 30 passes through the ornamental holes of the head 19. The lamp frame 13 is provided with a threshold (or doorsill or doorstep) 133 located under the door 16. The threshold 133 has a top face higher than a bottom face of the housing 11. Thus, the kerosene lighting 30 is mounted in the housing 11 steadily.

In the preferred embodiment of the present invention, the hanging member 20 is mounted on the head 19.

In the preferred embodiment of the present invention, the housing 11 further includes a plurality of ornamental bars 15 mounted on the lamp frame 13 and located outside of the transparent boards 14 to restrict, protect, and decorate the transparent boards 14.

In the preferred embodiment of the present invention, the door 16 includes a doorjamb (or doorframe or doorcase) and a transparent board mounted in the doorjamb. The lamp frame 13 is provided with a locking hole 18. The door 16 has a first end pivotally connected with the lamp frame 13 by a hinge and a second end provided with a pin 17 inserted into and locked in the locking hole 18 of the lamp frame 13 when the door 16 is closed.

In the preferred embodiment of the present invention, after the kerosene lighting 30 is removed from the housing 11 of the lamp body 10, the kerosene lighting 30 is operated individually and functions as a mobile illuminating device.

In another preferred embodiment of the present invention, the wall lamp functions as a ground insert lamp, a post lamp, a door lamp or the like. In operation, the kerosene lighting 30 functions as a light source of the wall lamp. After the pin 17 of the door 16 is detached from the locking hole 18 of the lamp frame 13, the door 16 is opened, such that the kerosene lighting 30 is removed from the housing 11 of the lamp body 10. In such a manner, the kerosene lighting 30 functions as a mobile lamp that is operated individually. After the kerosene lighting 30 is removed from the housing 11 of the lamp body 10, the brightness of the housing 11 is reduced. When the light sensitive device detects that the brightness of the housing 11 gets dimmed, the light sensitive device turns on the light source module to increase the brightness of the housing 11. Thus, the lamp body 10 functions as a lamp with special features.

Accordingly, each of the lamp body 10 and the kerosene lighting 30 functions as a mobile lamp and is operated individually, such that the wall lamp is available for various situations and places, thereby enhancing the diversity of the wall lamp. In addition, the wall lamp is used indoors and outdoors. Further, the wall lamp has a Bluetooth speaker function, thereby enhancing the versatility of the wall lamp.

Although the invention has been explained in relation to its preferred embodiment(s) as mentioned above, it is to be understood that many other possible modifications and variations can be made without departing from the scope of the present invention. It is, therefore, contemplated that the appended claim or claims will cover such modifications and variations that fall within the scope of the invention.

The invention claimed is:

1. A wall lamp comprising:
a lamp body;
a mounting unit mounted on the lamp body; and
a kerosene lighting mounted in the lamp body;
wherein:
the lamp body is attached to a wall or a bearing article by the mounting unit;
the lamp body includes:
a housing;
a door pivotally connected with the housing;
a charging seat mounted in the housing;
a light source module mounted in the housing; and
a light sensitive device electrically connected with the light source module;
the kerosene lighting is received in the housing and is mounted on the charging seat;
the kerosene lighting includes a pedestal, a lighting device, an acoustics device, a lamp holder, a lampshade, and a dimmer;
the pedestal is placed on the charging seat;
the acoustics device is mounted in the pedestal;
the lamp holder is mounted on the pedestal and located above the acoustics device;
the lighting device is mounted on the lamp holder;
the lampshade is mounted on the lamp holder and located outside of the lighting device;
the dimmer is mounted on the lamp holder and connected with the lighting device, to turn on/off the lighting device, and to regulate a brightness of the lighting device;
a Bluetooth receiver is mounted on the acoustics device;
a control panel is mounted on an outer face of the pedestal, to turn on/off the acoustics device, and to regulate a volume of the acoustics device;
the kerosene lighting is removed from the housing and is operated individually when the door is pivoted outward from the housing; and
the light sensitive device detects a strength of a light after the kerosene lighting is removed from the housing, and turns on/off the light source module.

2. The wall lamp of claim 1, wherein:
the housing includes:
a lamp frame; and
a plurality of transparent boards mounted on the lamp frame; and
the lamp frame is sealed by the transparent boards.

3. The wall lamp of claim 1, wherein:
the mounting unit has an L-shaped arrangement;
the mounting unit includes:
a side board; and
a bottom board connected with the side board;
the side board is mounted on a side of the lamp frame; and
the bottom board extends to a bottom of the lamp frame.

4. The wall lamp of claim 1, wherein:
the lamp body further includes a head mounted on a top of the housing;
the head is hollow and connected to the housing;

a lamp frame is provided with a threshold located under the door; and the threshold has a top face higher than a bottom face of the housing.

5. The wall lamp of claim 1, wherein:

the door includes a doorjamb; and a transparent board mounted in the doorjamb;

a lamp frame is provided with a locking hole; and the door has a first end pivotally connected with the lamp frame and a second end provided with a pin inserted into and locked in the locking hole of the lamp frame when the door is closed.

6. The wall lamp of claim 3, further comprising a hanging member mounted on a top or a side of the housing of the lamp body.

7. The wall lamp of claim 4, wherein the housing further includes a plurality of ornamental bars mounted on the lamp frame and located outside of transparent boards to restrict, protect, and decorate the transparent boards.

\* \* \* \* \*